(12) United States Patent
Fleischer et al.

(10) Patent No.: US 7,860,598 B2
(45) Date of Patent: Dec. 28, 2010

(54) METHOD, DEVICE, COMPUTER SYSTEM AND COMPUTER PROGRAM PRODUCT FOR CONTROLLING A MATERIAL FLOW

(75) Inventors: Helmut Fleischer, Geretsried (DE); Uve Czempik, Haag (DE); Wolfram Keil, Poing (DE); Christian Reckzeh, Kirchheim (DE); Markus Wimmer, Müchen (DE)

(73) Assignee: Oce Printing Systems GmbH, Poing (DE)

( * ) Notice: Subject to any disclaimer, the term of this patent is extended or adjusted under 35 U.S.C. 154(b) by 252 days.

(21) Appl. No.: 10/585,809

(22) PCT Filed: Jan. 26, 2005

(86) PCT No.: PCT/EP2005/000745

§ 371 (c)(1),
(2), (4) Date: Apr. 13, 2007

(87) PCT Pub. No.: WO2005/091188

PCT Pub. Date: Sep. 29, 2005

(65) Prior Publication Data

US 2008/0125901 A1    May 29, 2008

(30) Foreign Application Priority Data

Jan. 26, 2004   (DE)   ................. 10 2004 003 859

(51) Int. Cl.
*G06F 19/00*   (2006.01)
*G05B 13/02*   (2006.01)
*G06G 1/14*    (2006.01)
*G06Q 40/00*   (2006.01)
*G06Q 20/00*   (2006.01)

(52) U.S. Cl. .................... 700/116; 705/40; 705/22; 700/115; 700/95

(58) Field of Classification Search .............. None
See application file for complete search history.

(56) References Cited

U.S. PATENT DOCUMENTS

| 5,433,096 | A  | * | 7/1995  | Janssen et al. | ............ 70/278.3 |
| 6,305,548 | B1 |   | 10/2001 | Sato et al.    |                      |
| 6,366,742 | B1 | * | 4/2002  | Reihl et al.   | .............. 399/12 |
| 6,444,935 | B1 | * | 9/2002  | DeGraw         | ............. 209/573 |
| 2001/0024157 | A1 | * | 9/2001 | Hansmann et al. | ....... 340/10.41 |
| 2002/0038267 | A1 | * | 3/2002 | Can et al.    | ............. 705/28 |
| 2002/0087438 | A1 | * | 7/2002 | Kunieda et al. | .......... 705/28 |

(Continued)

FOREIGN PATENT DOCUMENTS

DE   197 51 517   5/1999

(Continued)

*Primary Examiner*—Albert DeCady
*Assistant Examiner*—Sunray R Chang
(74) *Attorney, Agent, or Firm*—Schiff Hardin LLP (57) ABSTRACT

In a method for controlling material flow in production, or a consumable or replacement part maintenance, of a product comprised of a plurality of individual parts, the individual parts are delivered to a goods receipt of a logistic system, a transponder being associated with the individual parts. In the transponder are stored production and delivery data regarding the individual part. The data of the transponder are read at the goods receipt and used for controlling further material flow such that the individual parts are transported in a controlled manner to subsequent process stations.

17 Claims, 2 Drawing Sheets

U.S. PATENT DOCUMENTS

| | | |
|---|---|---|
| 2002/0179484 A1* | 12/2002 | Frank .................. 206/557 |
| 2003/0102367 A1 | 6/2003 | Monette et al. |
| 2003/0132853 A1 | 7/2003 | Ebert |
| 2003/0209601 A1* | 11/2003 | Chung .................. 235/385 |
| 2003/0227392 A1 | 12/2003 | Ebert et al. |

FOREIGN PATENT DOCUMENTS

| | | |
|---|---|---|
| DE | 198 33 240 A1 | 2/2000 |
| DE | 199 44 688 A1 | 4/2000 |
| DE | 199 53 622 | 5/2001 |
| DE | 103 06 856 | 8/2004 |
| EP | 0 479 058 | 4/1992 |
| GB | 2 366 430 | 3/2002 |
| WO | WO 01/82009 | 11/2001 |
| WO | WO 03/077169 | 9/2003 |

\* cited by examiner

METHOD, DEVICE, COMPUTER SYSTEM AND COMPUTER PROGRAM PRODUCT FOR CONTROLLING A MATERIAL FLOW

BACKGROUND

The preferred embodiment concerns a method, a device, a computer program system and a computer program product for controlling a material flow in the production, the consumable part maintenance or the replacement part maintenance of a product comprised of a plurality of individual parts. In the production or the operation of such products (such as, for example, complex machines, for example automobiles, production systems, high-speed printing systems or the like), in particular in the maintenance of such systems with consumable parts and replacement parts, it is required that the parts are transported optimally correctly and quickly from the manufacturer of the individual parts to the user or a service provider implementing a service. For such logical tasks it is typical to use computer-aided monitoring systems. However, at the same time printed paper documents are used as before as delivery receipts, billing etc.

From WO 03/077169 A1 it is known to attach a transponder on a printed delivery receipt, in which transponder application-specific data can be stored, read and changed. From US 2003/0227392 A1 it is known to use radio-frequency identification systems (RFID) in supply chains. From WO 01/82009 A2 it is known to attach transponders to parts in an automated production process in order to store information relevant to the production in the transponders and in order to make the information available to various production stations.

From US 2003/0227392 A1 and US 2003/0132853 A1 it is known to track items in goods traffic.

The aforementioned publications are herewith incorporated by reference into the present specification.

An automated production monitoring system is known from US-A1-2003/102367, in which a transponder is used for transfer of delivered data for supply parts, which transponder is provided together with the supplied parts.

From DE-A1-197 51 517, for production of window frames it is known to provide the work piece with a transponder during the processing or treatment, in which transponder are contained data regarding the processing or treatment of the work piece.

A transponder-aided goods shipping system is known from DE-A1-199 53 622, in which goods are delivered to a goods container of a receiver that is secured with an access code. After ordering the good, the receiver programs a corresponding delivery code as an access code into the locking device of the goods container. Corresponding delivery code data of the good to be delivered are stored in the transponder. The transponder is read in order to be able to open the container and bin the good. The read and stored delivery codes must then coincide. As soon as the distributor has transferred the good into the container, a payment routine is initiated.

SUMMARY

It is an object of the preferred embodiment to optimally control the material flow in the production, the consumable part maintenance or the replacement part maintenance of products that are comprised of a plurality of individual parts, such that the production or the operation of the products is interrupted as little as possible and occurs with verifiable quality.

In a method for controlling material flow in production, or a consumable or replacement part maintenance, of a product comprised of a plurality of individual parts, the individual parts are delivered to a goods receipt of a logistic system, a transponder being associated with the individual parts. In the transponder are stored production and delivery data regarding the individual part. The data of the transponder are read at the goods receipt and used for controlling further material flow such that the individual parts are transported in a controlled manner to subsequent process stations.

DESCRIPTION OF THE PREFERRED EMBODIMENT

For the purposes of promoting an understanding of the principles of the invention, reference will now be made to preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

According to a first aspect of the preferred embodiment, in a method for controlling the material flow in the production, the consumable part maintenance or the replacement part maintenance of products that are comprised of a plurality of individual parts, the individual parts are respectively delivered to a goods receipt of a logistic system. A transponder is respectively associated with each individual part, in which transponder are stored production and/or delivery data regarding the individual part. The data of the transponder are read at the goods receipt and used for controlling the further material flow such that the individual parts are transported in a controlled manner to predetermined subsequent process stations.

Via the first aspect of the preferred embodiment, relative to conventional systems in which deliveries of goods are documented with printed delivery receipts, the previously-used paper is replaced by electronic data exchange. The data exchange in particular occurs between a distributor of goods and a logistics organization that supplies the goods from one of the distributors to a buyer. The data exchange can, however, also occur directly between distributor and buyer or between all three participating parties. Corresponding computer systems and read or write units of the distributor, logistic organization and buyer are networked with one another (for example via the Internet) for this.

According to a second aspect of the preferred embodiment that can also be independent of the first aspect of the preferred embodiment, a method for monitoring of the product quality of a product comprised of a plurality of individual parts is provided in which the individual parts are respectively delivered to a goods receipt and a transponder is respectively associated with each individual part, whereby quality data regarding the individual part are stored in the transponder. Further quality data are stored in the transponders at quality check stations for the individual parts and/or for aggregates or aggregate parts that are comprised of a plurality of individual parts.

According to the first two aspects of the preferred embodiment a plurality of individual parts serve for assembly of a product. The product can in turn be divided into various aggregates or into aggregate parts such as, for example, the drive motor of an automobile, the steering of an automobile or the fixing station or the developer station of an electrographic printing device. According to the preferred embodiment it is thereby provided to associate a transponder with each individual part, in particular already given the production and/or delivery of an individual part in the production factory or to a logistic system connected with this for the individual parts. According to the preferred exemplary embodiment of the invention, it is thereby provided that a specific group of individual parts is a mass production article that is delivered in a quantity of more than five in a container to the goods receipt of the production system of the complex product. The container thereby comprises the transponder, meaning that a plurality of individual parts is associated with a transponder. In particular delivery data of the container are stored in the transponder, for example the number of individual parts which are located in the container. Furthermore, data can be stored in the transponder that are common to the group of mass production articles of the container, for example a quality score, production date, production lot or the like. The transponder data can in particular be registered in a computer-aided production control system, material flow control system, consumable part maintenance system, replacement part maintenance system, service system, logistic system, materials administration system and/or quality control system associated with the production factory of the complex product. Based on the data stored in the transponder, it can thereby in particular be provided to supply the individual part or individual parts associated with the transponder or a part of a group of individual parts to a material store, a quality check station, a mounting station or a shipping station, in particular for consumable parts or replacement parts.

Furthermore, the logging and tracking of goods can be improved and simplified with the preferred embodiment. Processes, in particular goods flow processes and logistic processes, can be easily automated (and therewith optimized) with the preferred embodiment. The workflow is therewith furthermore rationalized. The error rate and the required time in the delivery is therewith furthermore minimized. Furthermore, via the storage of quality data in the transponder (and alternatively in computer networks) quality processes are improved in that they are in particular simplified and accelerated because fewer data inputs (manually or at various sites) are necessary.

According to further aspects of the preferred embodiment, a device, a computer system and a computer program product are provided for controlling a material flow.

According to the preferred exemplary embodiment of the invention, it is provided to implement the reading and/or the writing of data into or from the transponder with a mobile computer that comprises a first interface for wireless communication with the transponder and a second interface for wired connection (in particular with what is known as a docking station) with a computer network. What are known as handheld computers (personal digital assistant, PDA) that are distinguished by particular compactness have thereby proven to be particularly advantageous.

Via the transfer of digital electronic data stored in the transponder in direct connection with the goods, it is possible to transfer relevant production data and other data in real time and in a material flow-controlled manner from the manufacturer of the individual part to the operation or process further processing the individual part. The data processing system of the supplying operation and of the further-processing operation are thereby automatically electronically coupled in terms of data without an additional coupling or synchronization being necessary between their electronic data processing systems and the material flow of the individual parts.

According to a third aspect of the preferred embodiment that can likewise be viewed independent of both previously-cited aspects of the invention or can be advantageously combined with these, service-relevant data and/or recycling data regarding an individual part are stored in a transponder associated with the individual part such that, using the transponder data in a more complex product, it can be determined to what extent service applications are necessary regarding such individual parts (for example after what kilometer count, operating hour count or after which number of printed pages) and/or in which form the individual part is to be disposed of or to be reused. Such usage information can also be stored as tables in the transponder, dependent on performance data.

In a further advantageous exemplary embodiment of the preferred embodiment that can be combined with one of the three primary aspects cited above, an individual part can be housed in a package and the transponder can be applied to the package. After the data have been read from the transponder, the individual part is removed and directly supplied to a further handling, for example supplied to a production process, supplied to a storage, supplied to a shipping for consumable parts or replacement parts and/or supplied to a quality check station. It can thereby in particular be provided to use this package with the transponder again, in particular given recycling, i.e. in the return of the individual part to the manufacturer. This is primarily particularly reasonable when the package is particularly prepared in order to accept specific individual parts, for example via particular fasteners or cushioning permanently anchored in the package.

According to a further preferred exemplary embodiment of the preferred embodiment, a plurality of individual parts are assembled into an aggregate and an aggregate-related transponder is added to an aggregate, in which transponder are stored data about the aggregate. In particular regarding individual parts that have been delivered in a plurality in a container and with which only one transponder has been newly associated, the transponder data of the individual parts which have been read at the goods receipt station are thereby transferred into an electronic data processing system then read from the electronic data processing system and stored in the transponder associated with the aggregate.

According to a further advantageous exemplary embodiment of the preferred embodiment, at the goods receipt the input of an individual part is acknowledged by means of the transponder data, whereby the acknowledgement is transmitted to the distributors and/or to the manufacturers of the individual parts as a printout, as a transponder datum and/or via computer-aided methods (network, Internet, e-mail).

In a further preferred exemplary embodiment of the preferred embodiment, a plurality of transponders that are housed in common in a transport unit are read out essentially simultaneously with a detection device, in particular at the goods receipt. In particular a gate can be provided for this which can read out a large number of transponders within the shortest time. It is therewith possible to register a goods delivery that contains a plurality of individual parts on a pallet with a correspondingly large transponder number, and to transfer the data into an electronic data processing system.

Corresponding electronic data processing programs for the material administration, logistics, production control and/or quality assurance that can be inventively deactivated according to the preferred embodiment are known. The modular computer program product for various tasks in business transactions and goods traffic that is known from the company SAP Deutschland AG and Co. KG Walldorf appears to be particularly suitable for this.

According to a fourth aspect of the preferred embodiment, a method is specified for handling of a good with which a transponder is associated, whereby data about the good and/or the handling of the good are read and/or stored in the transponder.

According to a fifth aspect of the preferred embodiment, a method is specified for controlling a process, whereby data are stored in a transponder and/or read from a transponder. According to the preferred embodiment, in principle any process can be provided, in particular such processes with which an object can be associated. For example, document administration processes, document rights management, production, logistics, quality processes, recycling processes, disposal processes, software updating processes, auditing processes, service processes and so forth can be advantageously designed with the preferred embodiment.

According to the preferred embodiment, it was recognized that transponders can be advantageously used in the control of processes, in particular in goods traffic. In particular the following transponders/properties have thereby been advantageously utilized. Transponders are electronic storage media that can be alternately written to only once, written multiple times, and deleted. Transponders can be produced in various formats, in particular in the form of tags. Furthermore, transponders require no external energy source because they acquire their energy via electromagnetic radiation and can use it to feed their own electronic components. The energy feed thereby in particular occurs via corresponding read/write devices that emit the electromagnetic radiation. The data transfer between the read/write station and the transponder thereby occurs via modulation of the radiation.

Figure 1:
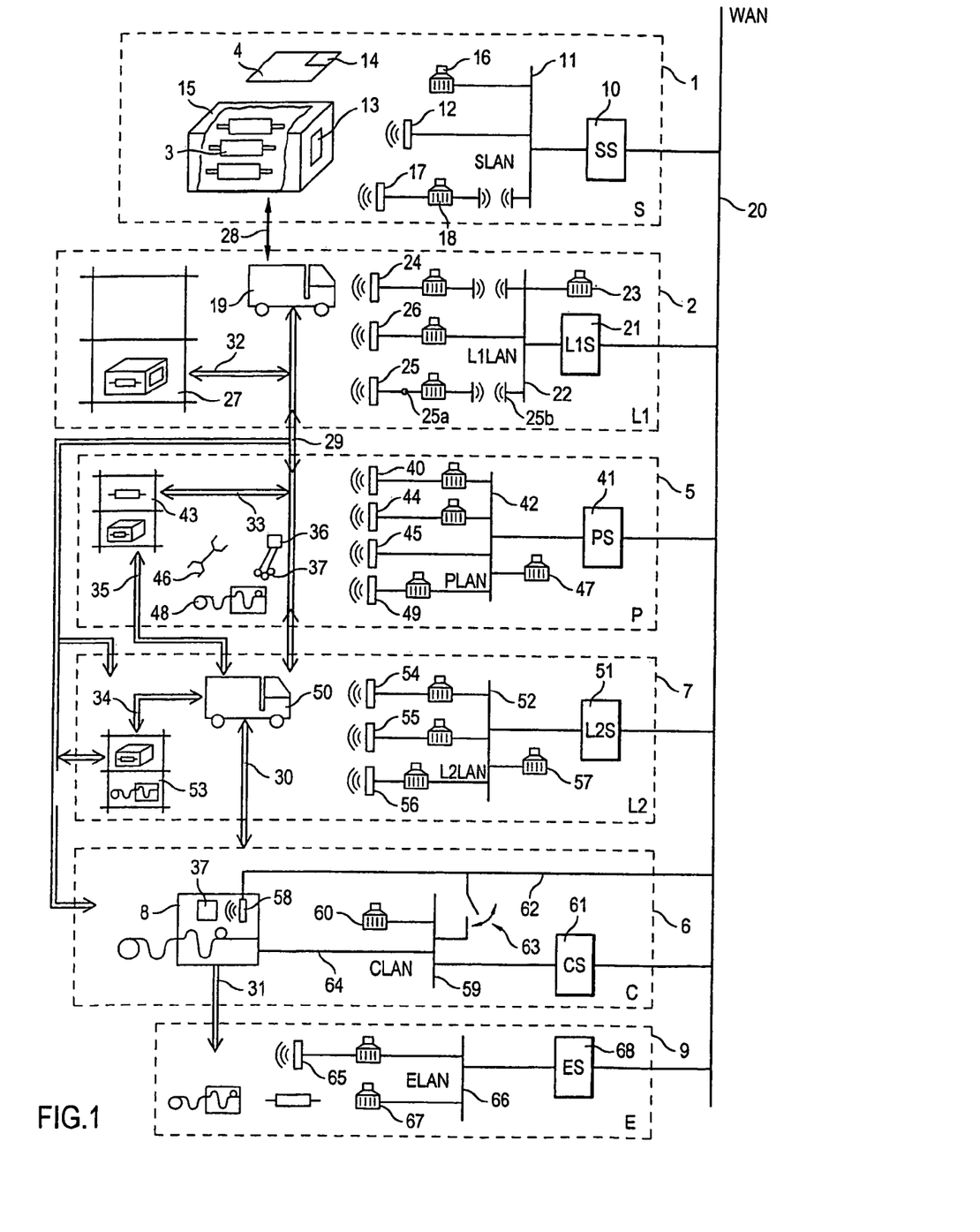
FIG. 1 shows a material flow from the producer of an individual part across the production of a complex product to its utilization to the disposal of the individual part.

In the example of a printing system, FIG. 1 shows the material and data flow given the manufacture, use and disposal of a product comprising a plurality of individual parts. Individual parts for printing devices, for example paper transport rolls 3 or electronic circuits 4, are produced at a supplier production site 1. The finished individual parts are passed to a first logistic system 2 for delivery to a production site 5 for printers or to a printing device end customer (customer) 6. In the event that it is logistically advantageous, the individual parts can also be delivered from the first logistic system 2 to a second logistic system 7 and from there be delivered to the production site 5 or the end customer 6, for example given an intercontinental shipping. A printing device 8 which works in production operation is located at the end customer 6. Consumable or replacement parts for this printing device 8 can be delivered directly from the manufacturer of the corresponding individual part 1 to the customer via one or both logistic systems 2, 7 or can arrive via the production site 5 or a service organization connected with this for exchange or installation at the end customer 6.

Consumable parts, replacement parts or the entire printing system 8 can be supplied in whole or in part to a recycling process after the expiration of its lifespan or be terminally disposed of. For recycling, it is in particular provided to return the corresponding parts back to the production site 5 and from there (or directly from the end customer) back to the supplier production site 1 of the individual part. For correct determination of the lifespans, the recycling or disposal channels, the manufacturer data and so forth it is in particular provided to store corresponding data in a transponder associated with the individual part in the finished complex product (printing device 8), at least regarding all individual parts for which particular recycling or disposal rules apply. The transponder can be attached directly to the individual part or to a larger device unit (aggregate) to which the individual part belongs.

The data-related connections between the individual participating systems are subsequently explained in detail. A supplier server 10 that is connected in a data-related manner with a local supplier network 11 (LAN, local area network) is provided at the supplier production site 1. Control programs with which the production of the paper transport rollers 3 and the electronic circuits 4 is controlled run on the supplier server 10. Production data such as, for example, manufacture date and time, initial materials used and their delivery data, quality data, identification data for production machines used and/or the persons operating them and so on are thereby recorded with regard to each individual part and/or to a respective group of individual parts. These data or data selected from these are transferred with a production transponder read/write device 12 to a transponder 14 located on the electronic circuit 4 at the respective circuit without contact and are stored there or are written at a group of 3 respective paper transport rollers 3 to transponders 13 respectively attached to the packaging 15 for the three transport rollers 3. Furthermore, a user computer 16 is provided on the network 11 with which the control programs running on the server 10 can be monitored and manipulated; in particular the goods traffic and the data written to the transponders 13, 14 can be monitored and adjusted. A further read-write system 17 is provided at the goods issue of the supplier production site 1. The read-write system 17 comprises a mobile pocket computer (PDA) that is connected with the network 11 via a wireless interface. The read-write unit 17 can thereby be used in a mobile manner and is in particular suitable for recording of transponder data, which transponder lies in an arbitrary orientation at a point of a larger packing unit that can only be reached with difficulty. As an alternative to this, it is also possible that the goods issue read/write system is to be designed such that it can detect transponder data over greater distance and is therefore in the position to radiate or to write to a plurality of transponders of a larger packing unit in a short time (of, for example, only one or a few seconds). In particular delivery data on outgoing goods or their packaging are written with the read/write system 17, which delivery data are typically located in delivery receipts (for example the delivery address, the goods designation and the delivery quantity).

For identification of the individual parts or of the respective packing it is in particular possible to use characteristic data of a specific transponder, for example the transponder-individual identification number (electronically stored in a transponder in a read-only memory range at its manufacture) and/or a transponder-individual number stored by the distributor in a programmable read-only memory range (PROM) or in a secured erasable programmable read-only memory range (EPROM). Corresponding numbers can also be assigned for specific material groups, for example for electronic circuits on the one hand and for paper transport rollers on the other hand, and a continuous number system can thus be achieved.

In order to be able to reuse packaging, it is advantageous to design specific memory regions of the transponder 13 as erasable or re-writable. The same packaging can then be regularly reused for various new productions. Via association of group numbers in a non-erasable range, the return of matching packaging regarding specific parts can be controlled exactly.

The goods are passed to the first logistic system 2 at the goods issue of the supplier production system 1. Given loading of the goods into the transport vehicle 19, all relevant delivery data have already been stored to the corresponding transponders of the goods. The corresponding delivery data can additionally be transmitted to a server 21 of the first logistic system 2 via a remote data connection 20 (for example the Internet) for a later comparison (confirmation of the delivery data) by the supplier server 10. This server 21 of the first logistic system 2 is connected via a first local logistic network 22 with a user computer 23 as well as wirelessly with a goods receipt transponder read/write system 24, wirelessly with a goods issue transponder read/write system 25 and via wires with a stock administration transponder read/write system. The goods traffic within the logistic system can therewith be precisely tracked with transport vehicles and a logistic storage 27. The logistic system can furthermore in particular be equipped with a global, satellite-driven positioning system (GPS) such as is described in U.S. Pat. No. 6,429,810 B1, for example. Its content is herewith incorporated by reference into the present specification at this point.

The goods transport paths and directions are specified in FIG. 1 with the arrows 28, 29, 30, 31, 32, 33, 34 and 35.

In the following it is described how the goods and data traffic occurs within a production site 5 when delivered individual parts (such as the paper transport rollers 3 or electronic circuits 4 as well as further individual parts) are assembled into a complex product (printing device). The individual parts are thereby delivered from a transport vehicle 19 to the goods receipt of the production site for printer 5 and there are read by a mobile or stationary goods receipt transponder read/write device. The read data are transmitted over a local network 42 of the production site to a server 41 of the production site. A goods management administration and control program runs there, for example a program from SAP AG Walldorf. It can thereby additionally be provided to transmit the transponder data determined at the goods receipt of the production site 5 (in particular after a manual or automatic check (weighing, scanning with image processing) and confirmation data as delivery confirmation via the remote data connection 20 to the logistic system 21 or to the supplier server 10.

The arriving individual parts can be placed in a plurality of identical containers, whereby a common transponder is provided for a group of containers (i.e. for a lot), in which transponder are stored the material, production, quality, recycling or disposal and delivery data and so forth regarding the lot.

Depending on the agreement between production site operator and suppliers, the delivered individual parts can thereby trigger payment obligations with the production site operator so that the good passes into the ownership of the production site operator or the good can be taken in trust by the production site operator and be put into storage for the supplier in a production site storage 43 until it is required for production. In this case, the removal of the corresponding part from the production site storage 34 is detected by a storage transponder read/write device 44 or by a transponder read/write device 43 attached at the assembly location 46 for an aggregate, and the payment obligation is first triggered given the removal from the storage or given the installation of the part in a printing device aggregate.

In addition to production and delivery data, quality data (for example tolerance values for mechanical or electronic components) can be stored in the transponder for individual parts. These quality data can be checked at quality check stations in the production site 5 and, if applicable, deviating data can additionally be stored in the transponder. In the event that the quality check yields that delivered individual parts lie outside of allowable tolerance ranges, the rejection and return of the flawed delivery can be automatically activated in the material administration system of the production server 41. Quality data regarding individual parts with which a transponder is associated not in a 1:1 ratio but rather in a 1:N ratio or whose transponder is attached to an outer packaging that is removed in the course of the placement in the production site storage 43 can be recopied into transponders that are attached on containers internal to the production site storage, are inserted into the individual parts, or the quality data can be recopied into the production site storage computer system such that they are available production site-wide via the production network 42. When such individual parts are installed into an aggregate of the printing system at an assembly station 46, the data associated with the individual part (concerning production, delivery, disposal and/or quality) can thus be written to a transponder located on the aggregate via the production network 42 and the read/write device 45. The aggregate transponder then has stored the corresponding data regarding all of its relevant individual parts. In particular in the region of the production site 5 it can be advantageous to provide data regarding an individual part and/or aggregate in a transponder respectively associated with this at multiple flow path stations regarding an individual part. It is thereby also possible that a n:m relation exists between a transponder and an individual part or an aggregate, whereby n, m are natural numbers.

On the production network 42 is a user computer 47, connected via the monitors to the control processes of the production site storage and be influenced via data inputs. At the goods issue 48 of the production site 5, finished printing devices 48 that have passed through the production process as well as replacement or consumable parts that have, if applicable, been stored in the interim in the production site storage 43 are delivered via path 35 to the second logistic system 7. The transponder data are read or written at the goods issue with a transponder read/write device 49. Given the delivery, a part- or device-specific transponder is read in turn and delivery data are generated. Workflow, data transmission and control can thereby occur in a manner analogous to the delivery from the supplier 1 to the first logistic system 2 or, respectively, from the first logistic system 2 to the production site 5.

For this, the second logistic system comprises at least one transport vehicle 50, a logistic server 51, a local network 52, an interim storage 53, a goods receipt transponder read/write device 54, a storage transponder read/write device 55 as well as a goods issue transponder read/write device 56 and a user computer 57 that are respectively connected to the local network 52. The logistic server 51 is connected with the aforementioned servers via the remote data connection 20.

A printing device 8 that produces printed documents at an installation location 6 at an end customer is equipped with a transponder read/write device 58. It is therewith in the position to read data from transponders on individual parts that are supplied to the customer site as expendable or consumable parts and to automatically display installation instructions corresponding to the read data as well as adjust part-individual control parameters or reset consumable part counters. For consumable or replacement parts whose transponder is attached to an outer packaging, the printing device can therewith also identify the corresponding part and undertake adjustments in the printer 8 or to computers that are connected to a local network 59 of the customer (in particular to a customer server 61), alternately additionally controlled by inputs on the customer-side user computer 60. The connection from the printer-internal read/write device 58 to the network 59 can in particular be interruptible via a switch 63. This in particular enables the customer to operate his own network 59 independent of the transponder-aided communication and to import print data into the printer via the separate print data line 64. On the other hand, the read/write device 58 can be directly connected to the remote data line 20 via a connection 62 in order to transmit delivery data, delivery confirmations and so forth to the servers 10, 21, 41 and/or 51. Server 61 is alternately also connected with the remote data line 20 so that corresponding delivery confirmations can be exchanged.

Printing devices, aggregates or individual parts that have served their time are supplied via path 31 to the disposal system 9 or are returned back to the production site 5 or to the supplier production site 1 via the paths 30, 29, 34, 35, 32, 28 for reprocessing (recycling). Given the return shipment of recycling parts, the materials traffic and the delivery workflow can be controlled in a data-related manner via transfer of the data of the transponders and/or per remote data line 20, just as with the delivery of new parts. In the disposal system 9, the disposal-relevant data (material, disposal instructions etc.) respectively available in a transponder regarding the printing devices, aggregates or individual parts are read without contact with a disposal transponder read/write device and supplied to the local network 66 of the disposal system. The disposal process can then be controlled via a disposal server 68 or user computer 67.

Figure 2:
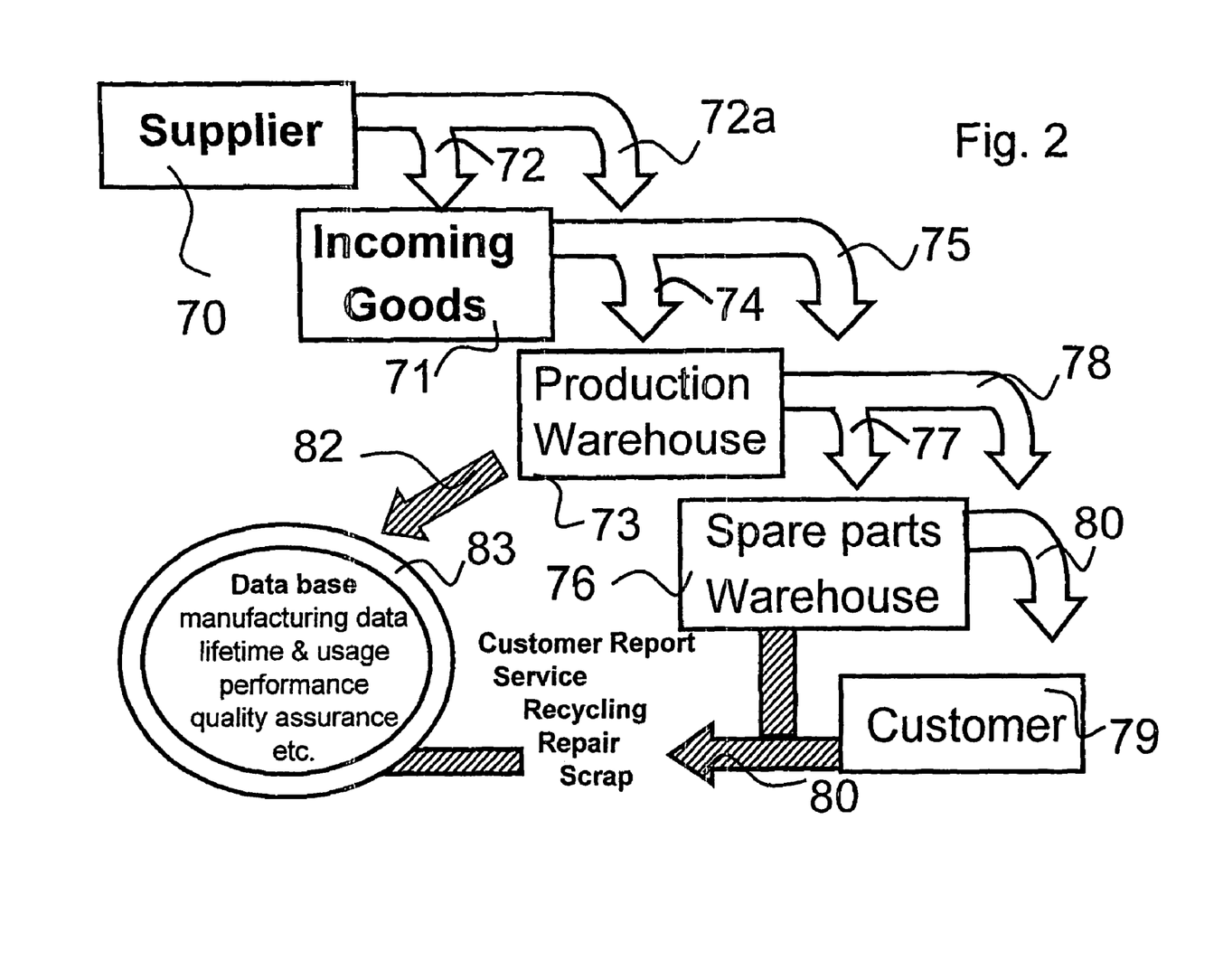
FIG. 2 shows an information flow corresponding to FIG. 1.

FIG. 2 shows material flow and data management in the example of the production site 5. Good 71 arriving from a supplier 70 via the material flow is alternately supplied via the material flow 74 to a production storage 73 or via the material flow 75 to a replacement part storage 76 (material flow 77) or directly to the customer 79 (material flows 78, 80). Data are surveyed from all participating material movements, material processings, assemblies and usages, which data lead in FIG. 2 to a data flow (drawn hatched) to a databank 83, in particular stored at the production site. In particular customer reports, server reports, recycling information, repair reports and disposal information come as data. Furthermore, production data, lifespan and usage data, performance data and quality data are stored in the databank 83. This opens extensive evaluation possibilities and possibilities for analysis of weak points, and thus for improvement of the product quality.

With the material flow system described above, a series of advantages can be achieved relative to conventional logistic systems. A first advantage is that a permanent quality assurance occurs from the manufacturer of the individual part up to the withdrawal (recycling) of the used part or up to its disposal, whereby both the product quality is improved and the environmental impact because material and production data regarding each product are available from the production of the individual parts up to the ultimate disposal/recycling. Due to the fixed local coupling between a transponder and the product associated with it (in particular when the transponder is permanently attached to the individual part/product), the logistical handling can be implemented with shorter passage time and minimal space requirement because the detection and tracking of goods can occur without contact and largely automatically. Transponder data and goods data in particular form a pair in a data-related manner. Non-metallic items can thereby be detected nearly simultaneously in large quantities with all prevalent transponder technologies (what is known as deep scanning). Given importation of the transponder data into a networked computer system, the advantage furthermore exists that a duplicate of the information on the transponder is available offline, meaning that the logistical or production-related processes can proceed even given a failure of a computer system. Relative to conventional methods, in which barcodes are applied to parts or packages, it is further more advantageous that a relatively large amount of memory as well as clear text can be stored as data and that the data can be changed at any time.

In a direct delivery process, in particular replacement parts or consumable parts of the supplier 70 can occur directly to the customer 80 via the process paths 72a, 75, 78 and 80. It is thus not necessary to install a computer network connection between the supplier 70 and the customer 80 in order to enable an orderly operation of the replacement or consumable part in a printing device of the customer 79. Since a transponder in which characteristic data of the part are stored is delivered with the replacement or consumable part, the printing device with an integrated transponder reader situated at the customer 79 can directly access the data stored in the transponder, if applicable correctly set corresponding device parameters, and thus ensure an orderly operation of the device on site at the customer. In reverse (given the recycling of replacement or consumable parts), with a transponder attached to a consumable or replacement part an operation evaluation of the replacement or consumable part can directly occur upon the return transport of the part from the customer 79 to the supplier 70 without data having to be input by the customer or the production center. Here as well the transponder simply and cost-effectively serves for the direct data transfer, whereby even production data are stored in the transponder that also enables the supplier 70 to backtrack the quality in his own manufacturer processes. It is self-evident that it is possible to read the data with a transponder reader as needed and, if applicable, to also provide the data via a computer network to other process participants (for example the production center).

Further developments of the preferred embodiment are also possible, in particular in the course of the connection of the system of the preferred embodiment to existing material administration control programs such as they are, for example, described in US 2003/0132853 A1 and in US 2003/0227392 A1. These publications are thus incorporated by reference into the present specification for this purpose.

Although the preferred embodiment was described using high-speed printers, the preferred embodiment can be used for a plurality of products, for example also for the manufacturing of products in which consumable materials for printers are introduced, for example complex toner reservoirs or ink reservoirs or devices. Furthermore, the preferred embodiment can be used for complex packages, books, transport units and goods storage applications, wine labels and so forth.

According to the exemplary preferred embodiment described above, delivery receipt information is exchanged between a transponder and a system server or between system servers. It can thereby be particularly advantageous to standardize such information and/or corresponding transfer formats so that the logistical and accounting processing of such goods traffic can occur optimally in simple fashion between arbitrary suppliers and recipients.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A method for controlling material flow in production of a product comprised of a plurality of individual mechanical or electronic assembly components as parts or part aggregates for assembly into said product, comprising the steps of:

producing said individual parts or part aggregates at a supplier production site;

recording production and delivery data regarding the individual parts or part aggregates, and in addition to said production and delivery data also recording quality data comprising at least one tolerance value range regarding the individual mechanical or electronic assembly components as said parts or part aggregates;

storing said production and delivery data and said quality data in an individual transponder physically connected to each individual part or individual part aggregate;

delivering said individual parts or part aggregates to a goods receipt of a logistic system;

reading said production and delivery data from the transponder at said goods receipt and using the data for controlling further material flow such that the individual parts or part aggregates are transported in a controlled manner to predetermined, subsequent assembly process stations at an assembly production site for said product;

before storage, reading and checking said quality data comprising said at least one tolerance value range at a quality check station of said assembly production site and if the quality check yields that said mechanical or electronic assembly components as said delivered parts or part aggregates lie outside of the at least one tolerance value range, then at said quality check station storing in the transponder a deviation data indicating an extent of deviation outside of said tolerance value range and automatically activating a rejection and return to said supplier production site of said outside tolerance range components with the corresponding transponder containing the deviation data;

taking in the individual parts by an assembly production site operator and storing them in an assembly production site storage until they are required for assembly to create said product;

detecting with a transponder reader a removal of an individual part or part aggregate from said assembly production site storage for its assembly to produce said product, and only triggering a payment obligation for the assembly production site operator upon said transponder reader detected removal of the individual part or part aggregates from the assembly production site storage to produce said product; and assembling said product from said electronic or mechanical assembly components.

2. The method according to claim 1 wherein at least one group of the individual parts or part aggregates is a mass production article that is delivered at the goods receipt in a quantity of more than five in a container, and wherein the container has the transponder connected thereto in which is stored a common quality score regarding the group of mass production articles in the container.

3. The method according to claim 2 wherein information about a quantity of the plurality of the articles located in the container is additionally stored in the transponder.

4. The method according to claim 1 wherein at least one of reading or writing of data at the transponder occurs with a mobile computer that comprises a first interface for wireless communication with the transponder and a second interface for communication with a computer network.

5. The method according to claim 4 wherein a wireless communication occurs via the computer network interface.

6. The method according to claim 1 where at least one individual part or part aggregate is housed in a package and the transponder is attached on the package.

7. The method according to claim 1 wherein a part aggregate-related transponder is added to a part aggregate of the parts, and data about the part aggregate are stored in the transponder.

8. The method according to claim 1 wherein an input of the part or part aggregate is recorded at the goods receipt by means of the transponder data.

9. The method according to claim 1 wherein the data belonging to an individual part or individual part aggregate and stored on its connected transponder, are stored on a further finished product transponder located on said assembled product in a finished state.

10. The method according to claim 1 wherein additional data regarding at least one of recycling or disposal are stored in the transponder associated with the individual part or part aggregate.

11. The method according to claim 1 wherein the data are at least one of recorded, stored or generated in a computer program and at least one of the material flow or production process are controlled by a computer.

12. The method according claim 1 wherein if a check for the quality data yields the quality data are deviating, then additionally storing the deviating quality data in the transponder.

13. The method of claim 1 wherein said read system when reading and checking said quality data at least one tolerance value range at said quality check station determines whether the delivered individual parts or part aggregates lie outside of said at least one tolerance value range, and if so, deviating data is additionally stored by a write system on the respective individual transponder.

14. A system for controlling material flow in production of a product comprised of a plurality of individual mechanical or electronic assembly components as parts or part aggregates for assembly into said product, comprising:

an individual transponder physically connected to each individual part or individual part aggregate, said transponder having stored therein production and delivery data regarding the individual part or part aggregate and in addition having stored therein quality data comprising at least one tolerance value range regarding the individual mechanical or electronic assembly component as said part or part aggregate;

a read system which reads said production and delivery data from the transponder at a goods receipt and which for controls further material flow such that the individual parts or part aggregates are transported in a controlled manner to predetermined, subsequent assembly process stations at an assembly production site for said product, and before storage said read system reading and checking said quality data comprising said at least one tolerance value range at a quality check station of said assembly production site for said product and if the quality check yields that said mechanical or electronic assembly components as said delivered parts or part aggregates lie outside of the at least one tolerance value range, then at said quality check station storing in the transponder a deviation data indicating an extent of deviation outside of said tolerance value range and automatically activating a rejection and return to said supplier production site of said outside tolerance range components with the corresponding transponder containing the deviation data;

a storage for taking in the individual parts or part aggregates at the production site until they are required for assembly to create said product; and a detection system for detecting with a transponder reader a removal of an individual part or part aggregate from said assembly production site storage for its assembly to produce said product, said detection system being utilized to only trigger a payment obligation for an assembly production site operator upon said transponder reader detected removal of the individual part or part aggregate from the assembly production site storage to produce said product.

15. The system of claim 14 wherein said read system, when reading and checking said quality data at least one tolerance value range at said quality check station, determines whether the delivered individual parts or part aggregates lie outside of said at least one tolerance value range, and if so, deviating data is additionally stored by a write system on the respective individual transponder.

16. The system of claim 14 wherein at least one group of the individual parts or part aggregates is a mass production article that is delivered at the goods receipt in a quantity of more than five in a container, and wherein the container has the transponder connected thereto in which is stored a common quality score regarding the group of mass production articles in the container.

17. The system of claim 14 wherein the data belonging to an individual part or individual part aggregate and stored on its connected transponder, are stored on a transponder located on further finished product said assembled product in a finished state.

* * * * *